May 1, 1928.  
R. C. HARRIS  
REFRACTING PRISM FOR TELESCOPES  
Filed March 24, 1924
1,668,015
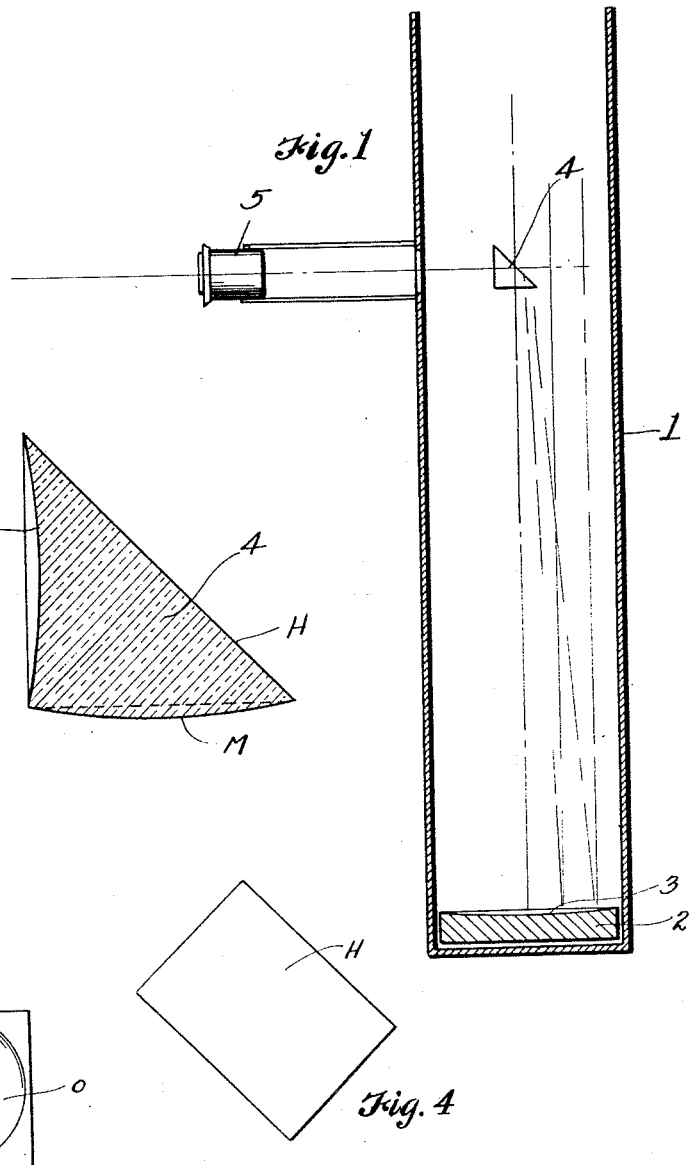

Patented May 1, 1928.

1,668,015

UNITED STATES PATENT OFFICE.

RALPH C. HARRIS, OF SEATTLE, WASHINGTON, ASSIGNOR OF ONE-HALF TO DALMIRO F. BROCCHI.

REFRACTING PRISM FOR TELESCOPES.

Application filed March 24, 1924. Serial No. 701,324.

This invention relates to improvements in telescopes and similar instruments, more particularly to telescopes of the reflecting type wherein there is an objective reflector disposed within the telescope tube with its axial line coincident with the axis of the tube and wherein means is provided for bringing the rays reflected thereby to a focus at a convenient point outside the telescope tube.

Explanatory to this invention, it will first be stated that, should an attempt be made to examine with the eye the direct image formed by the objective in a telescope of the type not equipped with means for bringing the rays to a focus outside of the telescope tube, some or all of the incident rays would be obstructed by parts of the body of the observer. Consequently, it is necessary that such provision of means be made whereby this result is avoided.

It will further be stated that at present several methods are used whereby reflected rays from the objective are brought to a focus outside the telescope tube. One of the common methods and means for doing this consists in placing a silvered mirror in such position within the telescope tube that it will take up and by reflection bring these rays to a focus at a point located on a line that is at a right angle to the axis of the telescope. While this means is effective for a time, it eventually becomes objectionable for the reason that the silver coating deteriorates through chemical reactions which cannot be prevented and gradually loses its reflecting property. It is moreover extremely delicate and will be injured by contact with the fingers, water or fumes.

Another means used, consists of an ordinary right prism of optical glass in which the bases are isosceles right angle triangles. This prism is placed so that one side faces the objective, the other side faces the ocular and the hypothenuse side is disposed at an angle of forty-five degrees to the optical axis so that, owing to the difference in density of the air and glass and certain properties of light, reflected rays of light from the objective enter the prism freely and are reflected by the hypothenuse surface of the prism, as in the case of the mirror, and emerge through the other side of the prism to the ocular.

The advantages of the silvered plate over the prism is that the image reflected by the former is identical with the image that would be formed directly if neither were used, while the image formed by the latter is inferior as to clearness, definition and true color due to the fact that all rays of light, except one, diverging from a point in space and reflected by the objective, intersect the sides of the prism at an angle with the normal to the sides at the point of intersection; this angle being different for rays which proceed from points at different distances from the center of the objective. Consequently they are refracted on entering and on emerging from the prism, are shifted in direction and in position in varying amounts and finally intersect the principal ray, which is the ray reflected by the center of the objective, at different points.

The advantage of the prism over the silvered mirror is, first, the amount of light reflected is greater, second, the efficiency of the prism is permanent.

In view of the above objectionable features to both the silvered mirror and prism, it has been the object of this invention to provide a reflecting prism, adapted to be used in the same way as the ordinary prism or reflector is used, but which has spherically curved surfaces facing the objective and ocular which so transmit the rays entering and leaving the prism as to avoid the refraction that otherwise would and which does take place in the ordinary flat faced prism and bring all rays to a focus the same as would be directly accomplished by the objective.

Other objects reside in the details of construction of the prism and in its disposition with relation to the parts associated therewith.

In accomplishing these objects, I have provided the improved details of construction, the preferred forms of which are illustrated in the accompanying drawings, wherein—

Figure 1 is a longitudinal sectional view of a part of a telescope equipped with a prism embodying the present invention.

Figure 2 is an enlarged, sectional view of the prism, taken in the plane of the center of the objective reflector, the eyepiece and center of prism.

Figures 3, 4, and 5, are face views of the prism; showing respectively the face through which rays enter from the objective, the hypothenuse face whereby they are reflected and the face through which they emerge to the eyepiece.

Referring more in detail to the drawings—

1 designates what may be a telescope tube, and 2 the objective, or reflecting mirror, mounted therein. The objective has a parabolically curved reflecting surface 3 with its axial line coincident to the axis of the telescope and whereby parallel rays of light entering the open end of the tube 1 are caused to be reflected back to a focal point that normally would lie in the axial line of the tube.

Mounted in any suitable manner in the tube so as to intercept these reflected rays of light, is a prism 4 embodying the present invention. At one side of the telescope tube is an eyepiece, or ocular 5, and this is disposed on a line that extends through the prism and at a perpendicular to the axis of the telescope.

The present invention resides in the construction of the prism 4 which, in cross section, is substantially in the form of a right angle isosceles triangle, as shown in Figure 2. The surface O of the prism facing the eyepiece is spherically concaved, and the surface facing the objective is spherically convexed. The axial lines of these surfaces are in a plane parallel to and equidistant from the triangular bases of the prism, and intersect at a point in the surface H at angles of forty-five degrees with this surface. The radius of each spherical surface equals its distance from the focus of the objective measured along the optical axis as reflected by the hypothenuse surface of the prism when the prism is properly positioned in the telescope.

With a prism so constructed, it is readily apparent that the image reflected thereby would be identical with a direct image for the reason that the rays of light proceeding from a point in space and reflected by the objective, intersect the sides of the prism in the direction of the normal to the sides at the points of intersection, therefore, they undergo no refraction and consequently no displacement in direction or position and finally intersect the principal ray at one and the same point.

By use of a prism of this construction, the objection, as in the case of the silvered mirror, to impaired efficiency is avoided, and the objection, as in the case of the plane surfaced prism, to blurred images, is overcome.

Having thus described my invention, what I claim as new therein and desire to secure by Letters-Patent, is:

In a telescope comprising a parabolic objective, or reflecting mirror, and an ocular disposed on an axial line that is perpendicular to the axis of the telescope and objective, a refracting prism having a cross sectional form substantially that of a right angle isosceles triangle and disposed with its reflecting surface at a forty-five degree angle to the axis of the objective and optic and having a spherically concave surface facing the optic and a spherically convex surface facing the objective, the radius of curvature of said surfaces being equal to their respective distances from the focus of the objective measured along the optical axis as reflected by the prism.

Signed at Seattle, King County, Washington, this 26th day of February, 1924.

RALPH C. HARRIS.